Dec. 17, 1968    B. P. HAYWARD    3,417,221
DISPLACEMENT MEASURING APPARATUS
Filed Nov. 15, 1965    2 Sheets-Sheet 1

United States Patent Office 3,417,221
Patented Dec. 17, 1968

3,417,221
DISPLACEMENT MEASURING APPARATUS
Brian Phillip Hayward, Sheldon, Solihull, England, assignor to Joseph Lucas (Industries) Limited, Birmingham, England
Filed Nov. 15, 1965, Ser. No. 507,735
1 Claim. (Cl. 219—109)

ABSTRACT OF THE DISCLOSURE

A displacement measuring apparatus for use with an electric welding machine having a pair of movable electrodes and apparatus associated with the electrodes to produce a signal which is indicative of the relative position of the electrodes. A comparator compares this signal with a signal that was generated and stored before the welding current was initiated. When the difference between the two signals attains a predetermined value, the welding operation is terminated.

---

This invention relates to displacement indicating apparatus for use with an electric welding or staking machine of the kind comprising a pair of electrodes between which a pair of components to be secured together are gripped and through which an electric current is passed.

When such machines are in use displacement of the electrodes takes place whilst the electric current is passing owing to expansion of the metal held between the electrodes in the case of spot, stitch or seam welding, or contraction owing to the collapse of one of the components as in projection and butt welding and staking. It has been found that the extent of this displacement of the electrodes is indicative of the quality of the joint produced by the machine and the object of this invention is to provide in a simple and convenient form apparatus for indicating the aforesaid displacement.

Displacement measuring apparatus for use with a machine of the kind specified comprises in combination a measuring device associated with the electrodes for producing a first signal indicative of the relative positions of the electrode at any instant whilst the machine is in use, a memory device for producing a second signal indicative of the value of the first signal at the instant when the electrodes contact the workpiece, means operable to enable a third signal equivalent to the difference between the first and second signals to be produced at least during the time when electric current is passing through the electrode and comparator means for comparing said third signal with a further signal of predetermined value, said comparator means being arranged to produce an output when the difference between said third signal and the further signal attains a predetermined value.

Figure 1:
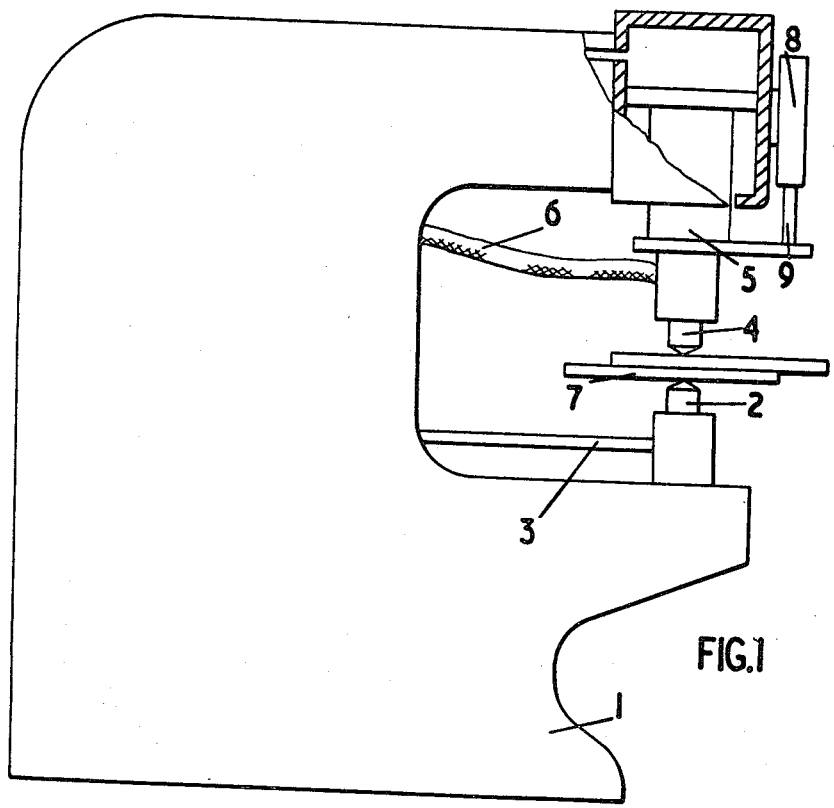
Figure 2:
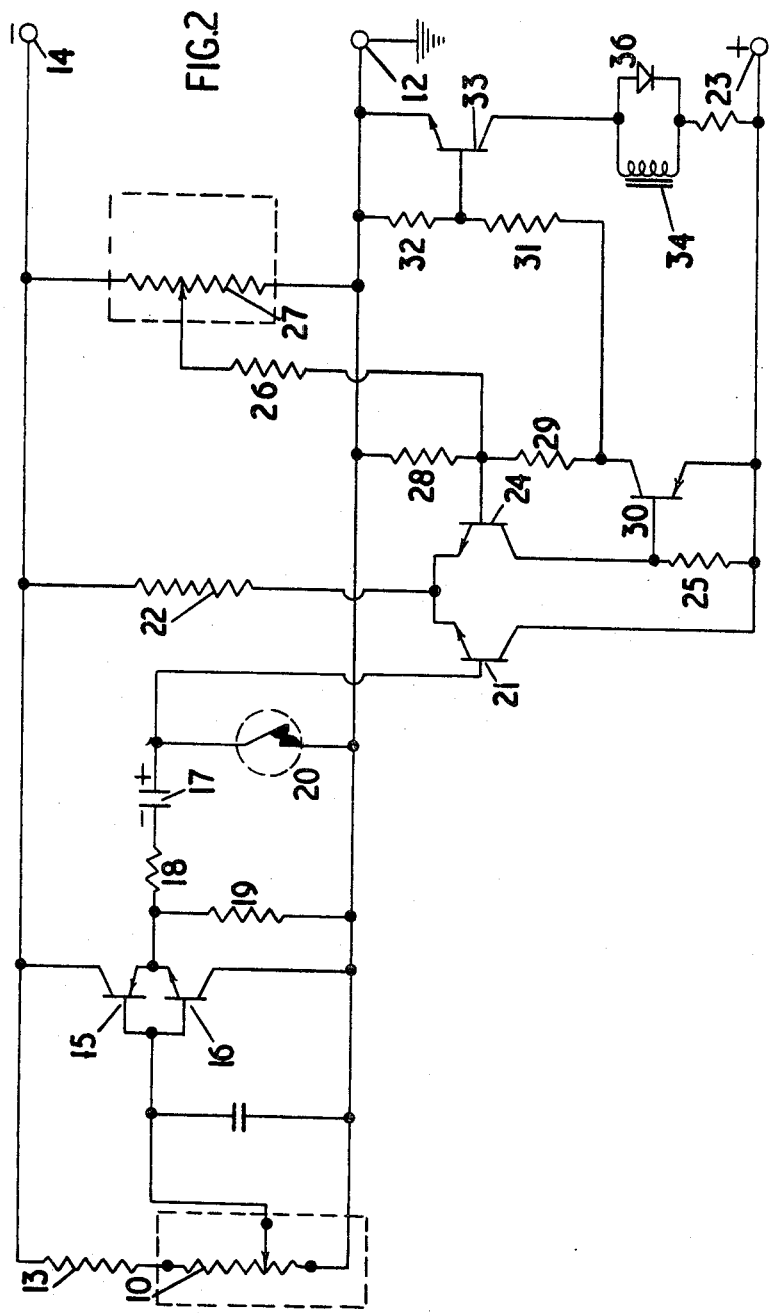

In the accompanying drawings:
FIGURE 1 is a diagrammatic view of one example of a welding machine with which the displacement measuring apparatus may be used, and
FIGURE 2 is an electrical circuit diagram of one example of the apparatus.

Referring to the drawings the welding machine includes a machine body 1 which is shaped to provide a C-shaped aperture. Mounted within the aperture is a lower electrode 2 which is fixed relative to the machine and which is connected through a conductor 3 to one end of the secondary winding of a welding transformer (not shown). Mounted above the lower electrode is an upper electrode 4 and this is carried on the piston rod 5 of a piston cylinder combination mounted in the body. The upper electrode is connected to the other end of the secondary winding of a transformer through a flexible conductor 6 and the cylinder is arranged to be supplied with air under pressure in known manner when it is desired to secure together a pair of components shown at 7. When the components are held together by the force exerted by the piston electric current is passed through the electrodes and components to cause local heating of the latter and at the end of the operation the passage of current is stopped and the electrodes moved apart to allow the components to be removed from the machine.

In applying the invention to such a machine a measuring device 8 is secured to the body of the machine, the measuring device having a control rod 9 which is moved by the piston rod 5. Electrically the measuring device is in the form of a potentiometer 10, shown in FIGURE 2, and having a slider 11 movable by the control rod 9.

One terminal of the potentiometer is connected to the earthed terminal 12 of a source of D.C. supply and the other terminal of the potentiometer is connected via a resistor 13 to a negative terminal 14 of the source of supply. The slider 11 of the potentiometer is connected to the base terminals of a pair of opposite conductivity type transistors 15, 16 which together constitute an emitter follower, and the collector electrodes are connected to the terminals 14, 12 respectively. The emitter terminals of these transistors are connected together and to one plate of a memory capacitor 17 via a resistor 18, there being provided a resistor 19 interconnecting the emitter terminals and the terminal 12. The other plate of the capacitor is connectible to the terminal 12 through a pair of normally closed relay contacts 20, these contacts being operable by a relay coil (not shown) which is arranged to be energised during the time current is passing through the electrodes of the welding machine. Said other plate of the capacitor 17 is also connected to the base terminal of a n-p-n transistor 21 having its emitter terminal connected to the supply terminal 14 via a resistor 22, and its collector terminal connected to a supply terminal 23 which is positive with respect to the supply terminal 12. Also provided is a further n-p-n transistor 24 having its emitter terminal connected to the emitter terminal of the transistor 21 and its collector terminal connected to the supply terminal 23 via a resistor 25. The base terminal of the transistor 24 is connected via a resistor 26 to the slider of a potentiometer 27 which is connected between the supply terminals 14 and 12. Moreover a resistor 28 is connected between the supply terminal 12 and the base terminal of the transistor 24.

The base terminal of the transistor 24 is connected via a resistor 29 to the collector terminal of an p-n-p transistor 30, the emitter terminal of which is connected to the supply terminal 23 and the base terminal of which is connected to the collector terminal of the transistor 24. Furthermore, the collector terminal of the transistor 30 is connected to the supply terminal 12 via resistors 31, 32 in series and a point intermediate the last mentioned resistors is connected to the base terminal of an n-p-n transistor 33, having its emitter terminal connected to the supply terminal and its collector terminal connected to the supply terminal 23 via a relay coil 34 and a resistor 35 connected in series, the coil 34 being connected in parallel with a diode 36 arranged with its anode connected to the collector terminal of the transistor 33. The relay coil 34 controls relay contacts (not shown) connected in the control circuits of the welding machine.

In use, the components to be joined are placed between the electrodes and the latter are moved towards each other until the components are pinched together. During this time the slider 11 moves and the memory capacitor 17 is charged to a voltage which is indicative of the relative position of the electrodes. The contacts 20 are then opened, this being affected by the control circuit of the welding machine as electric current is passed through the electrodes. At the instant the contacts 20 opens the voltage applied to the base of the transistor 21 is the same as that of the supply terminal 12 but as the electrodes are moved owing to the heating of the components an increasing negative going voltage is applied to the base of the transistor 21. This voltage is compared with the voltage developed across resistor 28 which is determined by the setting of the potentiometer 27 the latter being set so that when the electrodes have moved further by a predetermined amount, the circuit changes over and transistors 30 and 33 conduct thereby energising the relay coil 34, and operating the associated contacts of the relay to stop the flow of current through the electrodes and to cause the electrodes to be moved apart to release the components.

It will be appreciated that the displacement measuring apparatus can be used with a hot staking machine the basic mode of operation of which is substantially identical to that of the welding machine described.

Having thus described my invention what I claim as new and desire to secure by Letters Patent is:

1. Displacement measuring apparatus for use with an electric welding or staking machine having a pair of electrodes between which the components to be secured together are gripped, the apparatus comprising a measuring device for providing a first electric signal indicative of the relative position of the electrodes whilst the machine is in use, circuit means including a capacitor and a normally closed switch connected in series said circuit means arranged to charge said capacitor to a voltage representative of the magnitude of said first signal whilst said switch is closed, means for opening said switch when welding current is passed through said electrodes, the voltage across said switch at the instant of opening thereof being zero and subsequently varying as the electrodes are moved by weld expansion, comparator means for comparing the voltage across said switch whilst welding current is passing through the electrodes with a voltage of predetermined value, said comparator means being arranged to produce an output when the difference between said voltage of predetermined value and the voltage across said switch attains a predetermined value.

References Cited

UNITED STATES PATENTS

| 2,848,595 | 8/1958 | Van Sciver | 219—108 |
| 2,851,584 | 9/1958 | Sciaky | 219—86 |
| 2,996,604 | 8/1961 | Lemson | 219—110 |

RICHARD M. WOOD, *Primary Examiner.*

P. W. MAY, *Assistant Examiner.*

U.S. Cl. X.R.

219—110, 86